US008831565B2

(12) United States Patent
Karaoguz

(10) Patent No.: US 8,831,565 B2
(45) Date of Patent: Sep. 9, 2014

(54) POSITION-BASED CONTROL OF ACCESS TO ALTERNATIVE COMMUNICATION NETWORKS

(75) Inventor: Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 471 days.

(21) Appl. No.: 12/539,759

(22) Filed: Aug. 12, 2009

(65) Prior Publication Data

US 2010/0048172 A1 Feb. 25, 2010

Related U.S. Application Data

(60) Provisional application No. 61/091,523, filed on Aug. 25, 2008.

(51) Int. Cl.
| | |
|---|---|
| H04M 1/66 | (2006.01) |
| H04W 48/08 | (2009.01) |
| H04W 4/02 | (2009.01) |
| H04W 4/00 | (2009.01) |
| H04W 24/00 | (2009.01) |
| H04W 40/00 | (2009.01) |
| H04W 36/00 | (2009.01) |
| H04L 29/08 | (2006.01) |
| H04W 48/18 | (2009.01) |

(52) U.S. Cl.
CPC .............. *H04W 48/08* (2013.01); *H04L 67/18* (2013.01); *H04W 48/18* (2013.01); *H04W 4/02* (2013.01)
USPC ........ 455/411; 455/456.2; 455/436; 455/439; 455/442; 455/435.2; 455/433; 455/445; 370/331; 370/338

(58) Field of Classification Search
USPC ................................................ 455/465.1, 411
See application file for complete search history.

(56) References Cited

U.S. PATENT DOCUMENTS

| | | | | |
|---|---|---|---|---|
| 2003/0217122 A1* | 11/2003 | Roese et al. | ................... | 709/219 |
| 2006/0045056 A1* | 3/2006 | O'Hara, Jr. | ................... | 370/338 |
| 2006/0154699 A1* | 7/2006 | Ko et al. | ......................... | 455/574 |
| 2006/0174329 A1* | 8/2006 | Dublish | ........................... | 726/4 |
| 2007/0025292 A1 | 2/2007 | Maksymczuk et al. | | |
| 2007/0025293 A1 | 2/2007 | Choi | | |
| 2007/0032235 A1 | 2/2007 | Wahl et al. | | |

(Continued)

FOREIGN PATENT DOCUMENTS

| | | |
|---|---|---|
| CN | 1805578 A | 7/2006 |
| CN | 1942009 A | 4/2007 |

(Continued)

OTHER PUBLICATIONS

European Search Report for European Patent Application Serial No. 09010672.5-2413, dated Jan. 22, 2010.

*Primary Examiner* — Timothy Pham
(74) *Attorney, Agent, or Firm* — Garlick & Markison; Jessica W. Smith

(57) ABSTRACT

A system and method for determining, based at least in part on communication device position, whether access to an alternative communication network is authorized. Various aspects of the present invention may, for example and without limitation, comprise determining a position of a mobile communication device serviced by a communication network; determining, based at least in part on the determined position of the mobile communication device, whether the mobile communication device is authorized to access an alternative communication network; and communicating information regarding said determined authorization.

23 Claims, 6 Drawing Sheets

(56) References Cited

U.S. PATENT DOCUMENTS

| | | | |
|---|---|---|---|
| 2008/0101291 A1* | 5/2008 | Jiang et al. | 370/331 |
| 2008/0153497 A1* | 6/2008 | Kalhan | 455/436 |
| 2008/0181179 A1 | 7/2008 | Karaoguz | |
| 2009/0052426 A1* | 2/2009 | Perraud | 370/338 |
| 2009/0137206 A1* | 5/2009 | Sherman et al. | 455/41.2 |

FOREIGN PATENT DOCUMENTS

| | | |
|---|---|---|
| CN | 101242660 A | 8/2008 |
| KR | 20060063623 | 6/2006 |
| WO | 2007/089217 | 8/2007 |

\* cited by examiner

POSITION-BASED CONTROL OF ACCESS TO ALTERNATIVE COMMUNICATION NETWORKS

CROSS-REFERENCE TO RELATED APPLICATIONS/INCORPORATION BY REFERENCE

This patent application is related to and claims priority from provisional patent application Ser. No. 61/091,523 filed Aug. 25, 2008, and titled "POSITION-BASED CONTROL OF ACCESS TO ALTERNATIVE COMMUNICATION NETWORKS," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a modern communication system, communication service providers generally obtain revenue from the sale of communication network bandwidth. Often, such providers subsidize the initial purchase of various communication devices and plan to recuperate such up-front costs by selling communication bandwidth in the future.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for determining, based at least in part on communication device position, whether access to an alternative communication network is authorized.

These and other advantages, aspects and novel features of the present invention, as well as details of illustrative aspects thereof, will be more fully understood from the following description and drawings.

DETAILED DESCRIPTION OF VARIOUS NON-LIMITING ASPECTS

Figure 1:
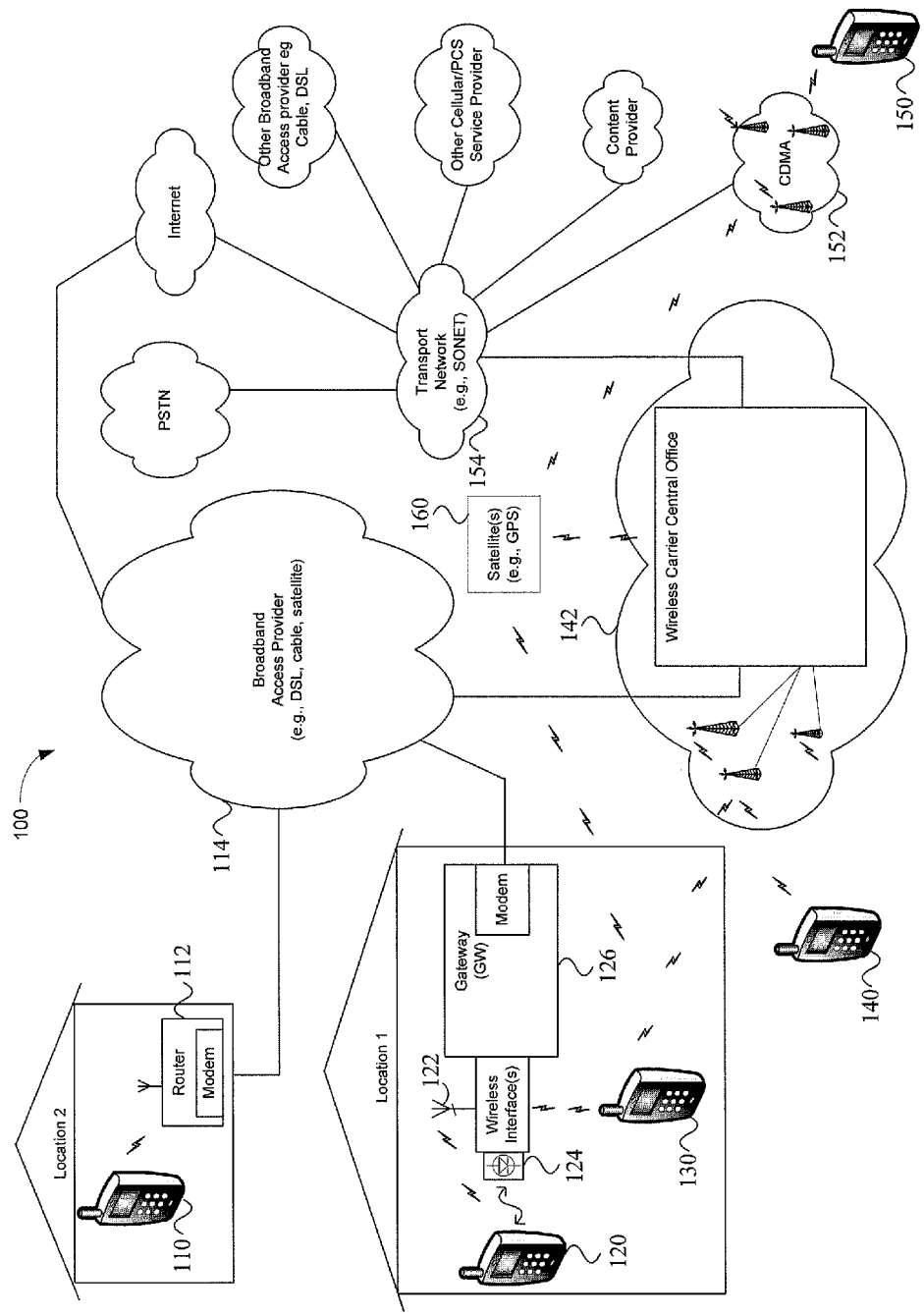
FIG. 1 is a diagram illustrating an exemplary communication system scenario incorporating position-based control of access to alternative communication networks, in accordance with various aspects of the present invention.

Communication service providers (e.g., operators of one or more communication networks) have a financial stake in selling communication bandwidth. Often, communication service providers (CSPs) are involved in subsidizing the purchase of communication devices (e.g., portable or mobile communication devices like cellular phones, personal digital assistants (PDAs), multimedia presentation devices, portable computers, handheld computers, portable email devices, etc.) with the goal of receiving a return on their investment through the sale of communication bandwidth (e.g., by selling service plans). As an example of selling communication bandwidth, CSPs often sell service plans along with the portable communication devices, where such service plans include a cost/minute aspect (e.g., either a flat cost per minute or a graduated cost plan).

At least a portion of mobile communication devices (MCDs) have multimode communication capability (i.e., the capability to communicate through a plurality of different types of communication networks). Such networks may, for example, include cellular communication networks (e.g., various GSM and/or CDMA-based cellular networks, like WCDMA, CDMA-2000, etc.), computer communication networks (e.g., WLAN, WPAN, WMAN, etc.), satellite communication networks, terrestrial television networks (e.g., cable) and/or telephone communication networks, etc. As a non-limiting example, a mobile communication device may comprise the capability to communicate with both cellular communication networks and wireless LAN networks.

As an example, a CSP that has a financial interest in selling bandwidth on a cellular communication network might lose potential revenue if a subscriber utilizes a wireless LAN for communication rather than the cellular communication network. For example, rather than utilize relative costly cellular communication bandwidth for voice communication, a subscriber might establish a communication link with a WLAN and utilize the WLAN (e.g., in conjunction with the Internet) to conduct voice communication (e.g., utilizing Voice-Over-IP (VoIP) technology). In such a scenario, a cellular CSP might lose potential revenue that would have been realized had the voice communication been conducted through the cellular communication network. Such a scenario may also apply to a multi-media providing service (e.g., music, movies, television, etc.), other audio and/or video multi-way communication service, web browsing service, gaming service, etc.

In another example, a CSP that has a financial interest in selling bandwidth on one or more "native" cellular and/or computer networks that is/are under the control (e.g., either directly or indirectly through agreements) of the CSP might lose potential revenue if a subscriber utilizes a "non-native" network (e.g., a WLAN, WMAN, cellular network, etc.) that is not under the control (e.g., either directly or indirectly through agreements) of the CSP. For example, rather than utilize the native one or more networks, a subscriber may chose to utilize a communication network (e.g., a WLAN or WMAN) that is different from the native communication network(s) under the control (explicitly or by agreement) of the CSP. In other words, a subscriber may chose to utilize a communication network that is not within the revenue-generating model of the CSP.

There are, however, situations where providing a mobile communication device access to alternative (e.g., non-native) communication pathways (e.g., through non-cellular networks or non-cellular networks operated by entities other than the CSP) is beneficial to the cellular CSP. For example, a cell (or other coverage area) associated with the CSP might be overloaded or at risk of becoming overloaded. Thus, the CSP (e.g., network operator or equipment thereof) may allow the MCD to freely access other networks and/or access other networks at various costs to the user (e.g., at normal cost, higher cost than normal, lower cost than normal or no cost depending on the particular situation).

As an example, a CSP, through processing positioning information for the mobile communication device might determine that too many mobile communication devices serviced by the operator are in a particular location. In such a scenario, the CSP (e.g., to prevent future overloading of the network) might authorize the MCD to utilize non-native computer network and/or data communication resources instead of native cellular telecommunication network resources. In other words, the CSP (network operator or various equipment thereof) may proactively anticipate an overload situation of the network and set the stage for offloading bandwidth utilization before the need for such bandwidth is affirmatively requested or realized in some manner. For example, the CSP may utilize information of respective positions of a plurality of mobile communication devices to proactively shift network resources (e.g., communication bandwidth resources, memory resources, signal processing resources, caching resources, etc.) based on determined respective positions of the plurality of mobile communication devices.

In another example, the native network might be operating in an overloaded (or nearly overloaded) condition already. An MCD might enter the overloaded region, and prior to the MCD requesting communication bandwidth (or while the MCD requests communication bandwidth), the CSP may authorize the MCD to utilize the bandwidth of other networks. The CSP may even go a step further and assist the MCD in establishing communication with the other network(s).

In still another example, the CSP (e.g., communication network equipment) might operate to authorize the MCD to communicate with other non-native networks at all times when the MCD is within a geographic region associated with operation in the home, while inhibiting or controlling such access when the MCD is being operated away from home. Such operation may also be reversed, for example, authorizing the MCD to communicate with other non-native networks while away from a geographic region associated with operation in the home, while inhibiting or controlling such access when the MCD is being operated within or near the home.

Though some of the previous examples discuss decision-making for the sake of network overloading, another benefit is that the CSP might operate to authorize the MCD to freely access other networks when the MCD is operating in a geographical area or location associated with relatively poor quality communication. For example, a CSP may be aware of (e.g., through electronic monitoring, customer complaints, etc.) that a particular geographic location or region is associated with relatively poor communication quality. The CSP may, in such a scenario, provide relatively more flexibility to an MCD operating in such a poor-quality area.

In general, based on the determined geographic position of the MCD, the CSP (or network operator or equipment thereof) may determine whether the MCD is allowed to access alternative communication networks. A communication service provider (or equipment thereof) may utilize positioning information corresponding to one or more mobile communication devices to determine whether to allow (authorize) access to particular networks. Note that such control may also be incorporated directly into the MCD (e.g. by the CSP or agent thereof) to enable the MCD to operate in accordance with a set of such geographic location-based access rules.

Figure 2:
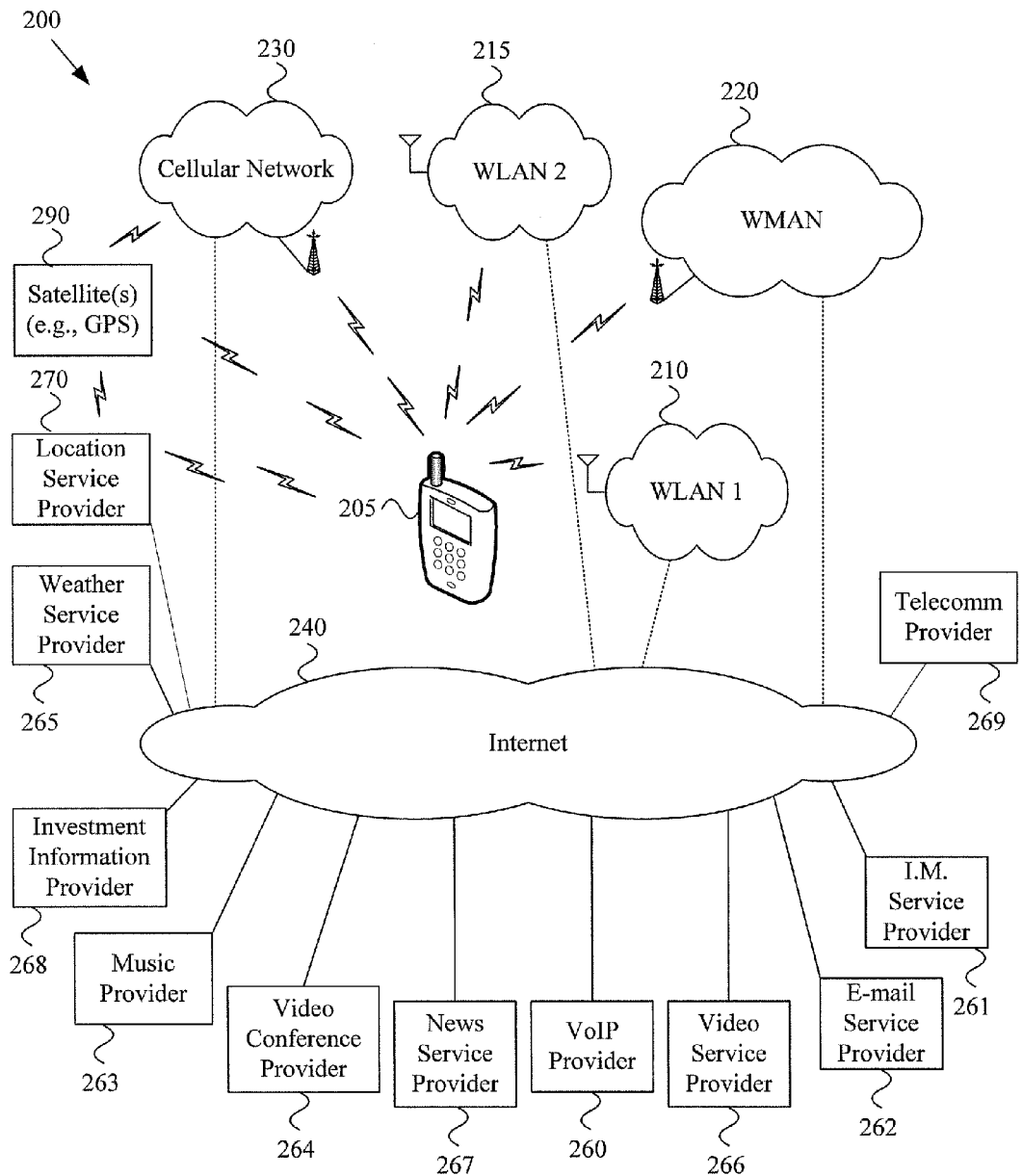
FIG. 2 is a diagram illustrating an exemplary communication system scenario incorporating position-based control of access to alternative communication networks, in accordance with various aspects of the present invention.

The following discussion of various method and/or system aspects will include discussion of various non-limiting exemplary communication system scenarios and/or environments. FIGS. 1 and 2 show two of such exemplary scenarios and/or environments. Such figures will first be briefly introduced and will then be referred to throughout the subsequent discussion.

FIG. 1 is a diagram illustrating an exemplary communication system scenario 100 incorporating position-based control of access to alternative communication networks, in accordance with various aspects of the present invention. The exemplary system scenario 100 includes, at location 1 (e.g., a premises or campus), a first MCD 120 coupled (i.e., communicatively coupled) to a local network through an optical wireless interface 124 and a radio frequency (RF) wireless interface 122. The local network at location 1 is then coupled through a gateway 126 and modem to a broadband access provider 114 (e.g., DSL, cable, satellite, etc.) and to many other networks through such broadband access provider 114. Also at location 1, a second MCD 130 is coupled to the local network through the RF wireless interface 122. The second MCD 130 is also coupled (or is capable of being coupled to) the wireless carrier network 142 (e.g., a cellular network, MAN, etc.).

The exemplary communication system scenario 100 also comprises, at location 2 (e.g., a premises, campus, etc.), an MCD 110 that is coupled via wireless RF link to a router 112 and modem, which are in turn coupled to the broadband access provider 114 (e.g., through a wired link). The broadband access provider 114 is, in turn, coupled (i.e., communicatively coupled) to the wireless carrier 142 (e.g., at a central office or elsewhere in the network).

The exemplary communication system scenario 100 also comprises a plurality of exemplary services coupled to the wireless carrier 142 and/or broadband access provider 114 through a transport network 154 (e.g., SONET, etc.) and/or the Internet. Such exemplary services, for example, may comprise the PSTN, Internet, content provider(s), other cellular service/PCS, other broadband access provider(s), etc. Such exemplary services may, for example, comprise a CDMA (e.g., cellular) network 152.

The exemplary communication system scenario 100 further comprises various other communication devices. For example, the scenario 100 comprises an MCD 140 that is coupled to the wireless carrier 142 via wireless RF link, and which may also be capable of being coupled to various local area networks (e.g., at Location 1 and/or Location 2). The MCD 140 may also be capable of being coupled to the CDMA network 152 and any of the other entities illustrated in FIG. 1.

Though the following discussion (e.g., of FIGS. 3-4) will mention the utilization of a variety of position-determining systems, FIG. 1 includes non-limiting examples of such position-determining systems. For example, the exemplary communication system scenario 100 comprises a Global Positioning System ("GPS") satellite system 160 that communicates signals directly to a mobile communication device 130 that may be received and processed by the mobile communication device 130 to determine its position. The mobile communication device 130 may then, for example, communicate information of its determined position to the wireless carrier 142 (e.g., for position-based authorization determination). Alternatively, the wireless carrier 142 (or other system entity) may implement an assisted GPS (or A-GPS) system, where the wireless carrier 142 receives positioning information from the GPS satellite system 160 and/or the mobile communication device 130 and/or various cell sites, and processes such information to determine the position of the mobile communication device 130. The wireless carrier 142 may then, for example, communicate information of the position determination to the mobile communication device 130 and/or process such information (e.g., to determine whether to authorize the mobile communication device 130 to access an alternative communication network).

FIG. 2 is a diagram illustrating an exemplary communication system scenario 200 incorporating position-based control of access to alternative communication networks, in accordance with various aspects of the present invention. The exemplary scenario 200 may, for example, share any or all aspects with the exemplary scenario 100 illustrated in FIG. 1. For example and without limitation, the Internet 240 may correspond to the Internet illustrated in FIG. 1. Also for example, the cellular network 230 may correspond to the wireless carrier 142 and/or CDMA network 152 illustrated in FIG. 1. Further for example, any of the service providers illustrated in FIG. 2 may correspond to any of the service providers illustrated in FIG. 1.

The exemplary communication system scenario 200 may comprise a variety of wireless communication networks (e.g., optical and/or RF wireless). Such networks may, for example, comprise a first wireless local area network (WLAN) 210, a second WLAN 215, a wireless metropolitan area network (WMAN) 220 and a cellular network 230. The exemplary scenario 200 may also comprise a communication device (e.g., a mobile communication device) 205 wirelessly coupled (or capable of being coupled to) any of such wireless networks. Such network may, for example, be coupled to and/or through private networks and/or the Internet 240.

The exemplary communication system scenario 200 also comprises a location services provider 270 that is communicatively coupled (e.g., wirelessly coupled) to the communication device 205. As will be discussed in more detail later, such a location service provider 270 may, for example, comprise aspects of the Global Positioning System or other satellite positioning system, terrestrial (e.g., nationwide, state-wide, community-wide, campus-wide and/or premises-based) location system, etc. Such location service provider 270 may, for example, operate to communicate position information (e.g., coordinate information, signals that may be processed by the recipient to determine location, etc.) with the communication device 205 and/or any networked entity associated therewith. The location service provider 270 may also, for example, be coupled to the Internet 240, which may in turn be coupled to any of variety of other networks and/or services (e.g., the Cellular Network 230, etc.).

Though the following discussion (e.g., of FIGS. 3-4) will mention the utilization of a variety of position-determining systems, FIG. 2 (as with the system 100 illustrated in FIG. 1) includes non-limiting examples of such position-determining systems. For example, the exemplary communication system scenario 200 comprises a Global Positioning System ("GPS") satellite system 290 that communicates signals directly to a mobile communication device 205 that may be received and processed by the mobile communication device 205 to determine its position. The mobile communication device 205 may then, for example, communicate information of its determined position to the cellular network 230 or other system entity. Alternatively, the cellular network 230 (or other system entity) may implement an assisted GPS (or A-GPS) system, where the cellular network 230 receives positioning information from the GPS satellite system 290 and/or the mobile communication device 205 and/or various cell sites, and processes such information to determine the position of the mobile communication device 205. The cellular network 230 may then, for example, communicate information of the position determination to the mobile communication device 205 and/or process such information (e.g., to determine whether to authorize the mobile communication device 205 to access an alternative communication network). Similarly, as mentioned above, the location service provider 270 may perform a similar A-GPS function (e.g., receiving positioning signals and/or information from the satellite system 290 and/or other system entities, determining position of the mobile communication device 205 and communicating such position information to the mobile communication device 205, cellular network 230 and/or other network entities.

The exemplary scenario 200 may also, for example, comprise any of a variety of service providers, each coupled to the Internet. Such service providers may, for example, comprise a telecommunication provider 269, instant messaging provider 261, email service provider 262, video service provider 266, Voice over Internet Protocol (VoIP) provider 260, news service provider 267, video conference provider 264, music service provider 263, investment information provider 268 and weather service provider 265. Any of such service providers may, for example, be communicatively coupled (e.g., through the Internet 240) to the communication device 205 (or to each other) through any of the wireless communication networks.

Various aspects of the present invention will now be discussed with references to FIGS. 3-6 and with occasional reference back to the exemplary scenarios 100, 200 of FIGS. 1-2.

Figure 3:
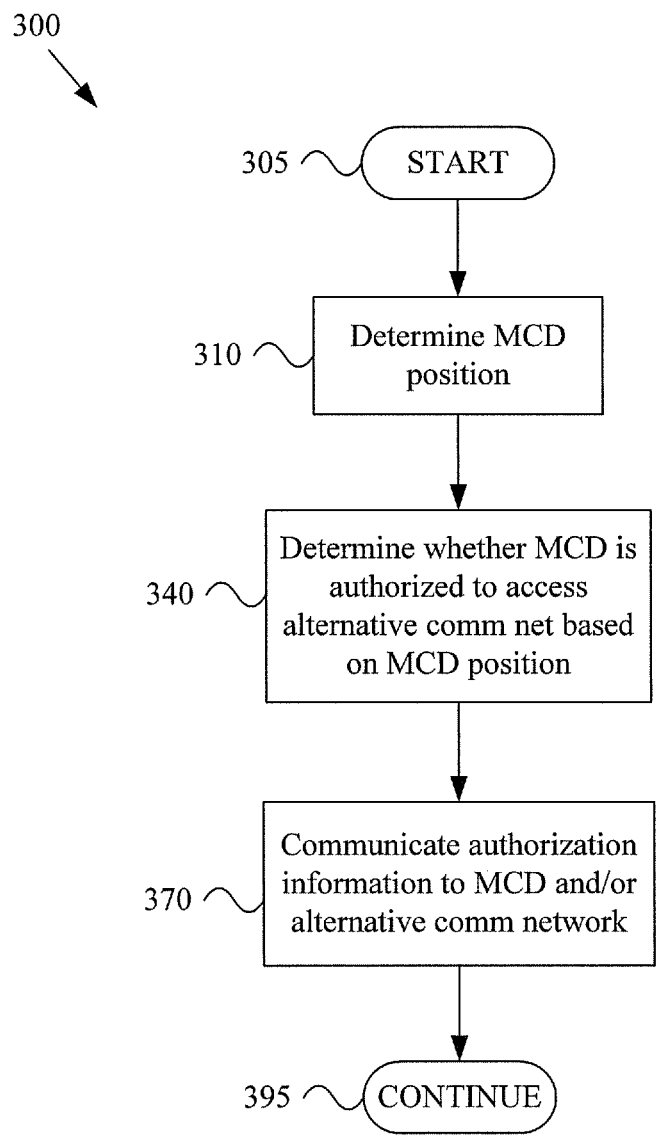
FIG. 3 illustrates a flow diagram of an exemplary method in a system and/or device for implementing position-based control of access to alternative communication networks, in accordance with various aspects of the present invention.

FIG. 3 illustrates a flow diagram of an exemplary method 300 in a system and/or device for implementing position-based control of access to alternative communication networks, in accordance with various aspects of the present invention.

The exemplary method 300 may, for example and without limitation, be performed by any one or more of a variety of communication network devices. For example, steps of the exemplary method 300 may be performed by communication network infrastructure equipment (e.g., by one or more hardware and/or software aspects thereof). For example, referring to FIG. 1, the steps of the exemplary method 300 may be performed by equipment of the wireless carrier central office (e.g., a central controller, subscriber account managing equipment, etc.) of the wireless carrier 142, equipment of the CDMA provider 152, equipment of the wireless LANs illustrated at locations 1 and 2, equipment of the broadband access provider 114, etc. Also for example, referring to FIG. 2, the steps of the exemplary method 300 may be performed by equipment of the cellular network 230, wireless LANs 210 and 215, wireless MAN 220, telecom provider 269 and/or the other service providers illustrated.

Also for example, steps of the exemplary method 300 may be performed by a mobile communication device (e.g., by one or more hardware and/or software modules thereof). As a non-limiting example, a communication service provider may incorporate software and/or firmware into a mobile communication device to perform authorization determination in accordance with rules specified by the communication service provider. Such authorization determination may, for example, be performed autonomously by a mobile communication device and/or by the mobile communication device in conjunction with the communication service provider.

The exemplary method 300 may begin at step 305. The exemplary method 300 may begin executing in response to any of a variety of causes and conditions, non-limiting examples of which will now be provided. For example, the exemplary method 300 may begin executing as a mobile communication device moves into a region or is detected in a particular coverage area.

Also for example, the exemplary method 300 may begin executing as the mobile communication device initializes and/or is powered up. Additionally for example, the exemplary method 300 may begin executing based on detected user interaction with the mobile communication device (e.g., based on detection of any user interaction, based on a user requesting or causing the mobile communication device to request access to a particular communication network, based on user execution of a particular software application associated with communication over a particular or particular type of communication network, based on a user command to search for a higher quality communication link, etc.).

Further for example, the exemplary method 300 may begin executing during a communication (e.g., as communication quality between a mobile communication device and a communication network degrades to a particular point). In an exemplary scenario, a mobile communication device might only be authorized to access an alternative communication network if the primary communication network cannot provide a particular level of communication quality to the mobile communication device. Such quality may, for example, be a determined present quality or may be a predicted future quality. For example, a cellular telephony communication provider might govern operation of a mobile telephone by only allowing VoIP communication over the Internet in a situation where the cellular network is unable to provide a particular level of communication quality to the mobile communication device. In such a scenario, execution of the exemplary method 300 may be triggered by a real-time quality determination and/or prediction. Also for example, the exemplary method 300 may begin executing in response to a determination by the primary communication network that the network is relatively low on communication bandwidth available for the mobile communication device.

In a further example, execution of the exemplary method 300 may begin in response to a determination of a particular number of subscribers (e.g., mobile communication devices). For example, a relatively large number of subscribers may be detected in a particular area, and to avoid a communication traffic jam in the primary communication network, the exemplary method 300 may be executed to provide authorization to one or more of the subscribers in the particular area for using one or more alternative communication networks.

In yet another example, execution of the exemplary method 300 may begin in response to time (e.g., time-of-day, day, type-of-day, date, etc.). For example, the exemplary method 300 may begin executing in response to a timetable reflective of communication network utilization and/or quality. For example, the exemplary method 300 may begin executing to provide or remove authorization to users at particular locations at different times. In time-based execution, such execution may be generally periodic (e.g., every hour, 5 minutes, etc.) or may be non-periodic.

Still further, execution of the exemplary method 300 may begin in response to detected mobile communication position (e.g., absolute position or a change in position). For example, the method 300 may begin executing when it is detected that a mobile communication device is in motion and will be traveling in and out of range of various alternative communication networks.

Also for example, the exemplary method 300 may begin executing in response to a communication from an alternative communication network (e.g., inquiring whether a particular mobile communication device is authorized for access or requesting such authorization) independently or acting as an intermediary between the mobile communication device and the service provider.

In general, the exemplary method 300 may begin executing in response to any of a variety of causes and/or conditions. Accordingly, the scope of various aspects of the present invention should not be limited to characteristics of any particular initiating causes and/or conditions unless explicitly claimed.

The exemplary method 300 may, at step 310, comprise determining position of a mobile communication device (e.g., a mobile communication device serviced by the communication network). Step 310 may comprise determining such position in any of a variety of manners, non-limiting examples of which will now be provided.

For example, step 310 may comprise receiving information of the mobile communication device position. For example, step 310 may comprise receiving such information from the mobile communication device. For example, the mobile communication may determine its location (e.g., geographical coordinates, street address, etc.) and communicate such information to the communication network. Such communication may, for example, occur utilizing general informational protocol messages and/or a specific type of protocol message(s) specifically adapted for the communication of such information.

The mobile communication device may determine its position in any of a variety of manners. For example, the mobile communication device may determine its position through interacting with a positioning-system (e.g., a satellite positioning system like the Global Positioning System—GPS; a terrestrial positioning system, e.g., based on triangulation between network transceivers, like cellular transceivers, premises pods utilizing UltraWideBand or 60 GHz transceivers, etc.; an Assisted-GPS, or A-GPS, system; etc.). Also for example, the mobile communication device may determine its position based on detectable network signals (e.g., beacon signals {e.g., IEEE 802.11 signals}, signals being communicated between a network and other communication devices, polling signals, sync signals, training signals, other broadcast signals, etc.) associated with networks and/or transceivers at known locations, by direct user input of position information, information obtained via a mapping system executing onboard the mobile communication device, etc.

Also for example, step 310 may comprise receiving information of the mobile communication device position from the alternative communication network. For example, the alternative communication network may communicate position information to the communication network (e.g., in an unsolicited manner upon inquiry by the communication network, upon request by the mobile communication device, etc.).

Further for example, step 310 may comprise receiving information of the mobile communication device position from a variety of other systems external to the mobile communication device, the communication system and the alternative communication system. Also for example, step 310 may comprise receiving information of the mobile communication device position from an external position-determining system that determines the position of the mobile communication device (e.g., through triangulation, through communication with systems to which the mobile communication device is in-range or out-of-range, etc.) and communicates information of determined position to the communication network (e.g., directly or indirectly via the alternative communication network and/or the mobile communication device).

In yet another example, step 310 may comprise determining the position of the mobile communication device utilizing position-determining that is native to the communication network. In an exemplary scenario, a cellular service provider may determine position of the mobile communication device utilizing triangulation capability native to such network (e.g., emergency service triangulation capability, etc.). In such a scenario, the entity of the communication network determining whether the mobile communication device is authorized to access the alternative communication network (e.g., a network controller) may receive position information of the mobile communication device from the native position-determining system.

As will be explained later in various examples, position information may also comprise velocity information, which may be used to determine whether the mobile communication is authorized to access the alternative communication network. Accordingly, the previous discussion applies to velocity information of the mobile communication device, as well.

In general, step 310 may comprise determining position of a mobile communication device in any of a variety of manners. Accordingly, the scope of various aspects of the present invention should not be limited by characteristics of any particular manner of determining position of a mobile communication device unless explicitly claimed.

The exemplary method 300 may, at step 340, comprise determining, based at least in part on the determined position of the mobile communication device (e.g., as determined at step 310), whether the mobile communication device is authorized to access an alternative communication network (e.g., an alternative communication network independent of one or more primary communication networks). Step 340 may comprise determining such authorization in any of a variety of manners, non-limiting examples of which will now be provided.

Note that step 340 may be performed by any of a variety of communication devices and/or communication system entities. For example and without limitation, step 340 may be performed by a network control associated with a primary communication network or communication service provider. Also for example, step 340 may be performed by a mobile communication device (e.g., one that has been programmed with software and possibly enhanced with additional hardware to perform such functionality). Such an implementation may, for example, offload central authorization processing to the individual mobile communication devices, yet still operate in accordance with rules controlled by the primary communication service provider.

Step 340 may, for example, comprise determining whether the mobile communication device is authorized to access an alternative communication network based solely on position of the mobile communication device. For example, a communication service provider may authorize a mobile communication device to access an alternative communication network (e.g., a particular one or more alternative communication networks, all alternative communication networks, etc.) when the mobile communication device is at a particular geographical location (e.g., at home, at the office, at the airport, at an entertainment venue, at a hotel, etc.). Such authorization, based solely on position, may be granted to all users, as part of a particular service plan, etc.

Step 340 may also, for example, comprise determining whether the mobile communication device is authorized to access an alternative communication network based on various types of information in addition to position. The following discussion will provide non-limiting examples of such operation.

For example, step 340 may comprise determining whether the mobile communication device is authorized to access an alternative communication network based also, at least in part, on communication quality. As an example, step 340 may comprise determining that the communication network is not providing service (e.g., telephony service) to subscribers at a particular position (or in a particular geographical area) at a particular desired level of quality. In such an exemplary scenario, step 340 may comprise determining that all (or a portion of) subscriber mobile communication devices operating in such area are authorized to utilize an alternative communication network (e.g., for all communication, just for voice communication, etc.). As another example, the quality may be determined present quality or may be predicted future quality (e.g., anticipating that a network or network node is progressing toward an overloaded condition). Such quality may, for example, be determined automatically by the communication network or may be reported by a user of the mobile communication device (e.g., in a request for alternative communication service options). As yet another example, step 340 may comprise determining whether the alternative communication network will provide communication service to the mobile communication device above a minimum quality level and refrain from authorizing utilization of the alternative communication network unless the subscriber can expect a threshold level of minimum quality.

Note that such quality determination and/or authorization might be for utilization of the alternative communication network in conjunction with the communication network rather than instead of the communication network. For example, step 340 may comprise determining that in a particular geographic area, a mobile communication device is authorized to utilize an alternative communication network in conjunction with the communication network to enhance the overall quality of communication for the mobile communication device.

Also for example, step 340 may comprise determining whether the mobile communication device is authorized to access an alternative communication network based also, at least in part, on current bandwidth utilization of the communication network. As an example, step 340 may comprise determining that the communication network is operating (e.g., at a particular position or area) at a bandwidth utilization level that is higher than desired or heading toward a level that will be higher than desired. In such an exemplary scenario, step 340 may comprise determining that all (or a portion of) subscriber mobile communication devices operating in such area are authorized to utilize an alternative communication network. Alternatively, when such bandwidth utilization returns (or is predicted to return) to desirable levels, previously granted authorization may be retracted, and current requests for such authorization may be refused. In an exemplary scenario where step 340 comprises determining authorization based also, at least in part, on predicted future bandwidth utilization, step 340 may comprise predicting future bandwidth utilization in any of a variety of manners (e.g., based on determined number of subscribers detected or predicted to be in an area, based on historical utilization trends, etc). Such an area may, for example, be based on a particular venue, intersection, campus, transportation hub, office, building, etc.

Additionally for example, step 340 may comprise determining whether the mobile communication device is authorized to access an alternative communication network based also, at least in part, on a type of information to be communicated between the mobile communication device and the alternative communication network. In an exemplary scenario, step 340 may comprise determining that a mobile communication device located at a particular position may access one or more alternative communication networks for the communication of music and/or multi-media information but not for voice communication, which must be communicated through the primary communication network(s). In another exemplary scenario, step 340 may comprise determining that, while the mobile communication device is operating at a home location, the mobile communication device is authorized to access the local wireless LAN for general web browsing and email, but not for voice communication.

Further for example, step 340 may comprise determining whether the mobile communication device is authorized to access an alternative communication network based also, at least in part, on time. In an exemplary scenario, step 340 may comprise determining that a mobile communication device positioned along a traditionally congested traffic route during a time associated with rush hour traffic is authorized to utilize one or more alternative communication networks. In such an example, the communication service provider (or network components associated therewith) may determine that the communication network along particular traffic routes is likewise congested and desire to encourage mobile communication device utilization of alternative communication networks to relieve congestion on the primary communication network(s). In another example, a mobile communication device may be granted access to an alternative communication network at a registered work location during business hours, but not at the registered work location during non-business hours.

Still further for example, step 340 may comprise determining whether the mobile communication device is authorized to access an alternative communication network based also, at least in part, on day (e.g., day of the week, type of day, etc.). In an exemplary scenario, step 340 may comprise granting a mobile communication device authorization to utilize an alternative communication network (e.g., for voice communication) during the work week, but not on the weekends. Further for example, step 340 may comprise granting unconditional access to all alternative networks at a particular shopping mall during a set of days associated with a particular holiday.

Yet further for example, step 340 may comprise determining whether the mobile communication device is authorized to access an alternative communication network based also, at least in part, on an identity of a business entity associated with the alternative communication network. In an exemplary scenario, step 340 may comprise determining that although normally access to an alternative communication network at a particular location would not be authorized, since the alternative communication network is associated with a particular business entity (e.g., a business entity with which a communication service provider has a business relationship or other agreement), such access will be authorized. Such business entity may, for example, own or operate the alternative communication network.

Also for example, step 340 may comprise determining whether the mobile communication device is authorized to access an alternative communication network based also, at least in part, on the style of communication to be conducted between the mobile communication device and the alternative communication network. In an exemplary scenario, step 340 may comprise determining that a mobile communication device located at a particular position is authorized to access one or more alternative communication networks for communicating data packets over a packet-switched network with non-guaranteed bandwidth, but not for communication utilizing connection-oriented communication with guaranteed bandwidth. In another example, a mobile communication device at a particular location may be authorized to utilize the alternative communication network for voice communication over a packet-switched network but not utilizing the QoS functionality of the alternative communication network. In yet another example, step 340 may comprise authorizing utilization of an alternative communication network at a particular location for non-real-time communications (e.g., file transfer and email activity) but not for real-time communications (e.g., real-time voice communication).

Additionally for example, step 340 may comprise determining whether the mobile communication device is authorized to access the alternative communication network based also, at least in part, on whether the access is for continuing a communication currently in progress or for beginning a new communication. In an exemplary scenario, step 340 may comprise determining that a mobile communication device in a particular area is authorized to utilize an alternative communication network for continuing a communication that was previously being conducted over the primary communication network(s) (e.g., to maintain continuity of the on-going communication), but not authorized to utilize such alternative communication network to initiate a new communication.

Further for example, step 340 may comprise determining whether the mobile communication device is authorized to access the alternative communication network based also, at least in part, on velocity of the mobile communication device. In an exemplary scenario, step 340 may comprise processing position and velocity of the mobile communication device to anticipate whether the mobile communication device is likely to enter into (or exit from) an area in which authorization to an alternative communication network is allowed or disallowed. In such an exemplary scenario, authorization for accessing an alternative communication network can be determined, obtained and/or communicated prior to the need arising for such authorization.

In another example scenario, step 340 may comprise determining whether the mobile communication device is authorized to access the alternative communication network based also, at least in part, on the degree to which such utilization has occurred in the past (e.g., in the present billing cycle). For example, at a particular location, step 340 may comprise granting only a particular amount of access to the alternative communication network(s) during a particular billing cycle.

In general, step 340 comprises determining, based at least in part on the determined position of the mobile communication device (e.g., as determined step 310), whether the mobile communication device is authorized to access an alternative communication network. Accordingly, the scope of various aspects of the present invention should not be limited by characteristics of any particular manner of determining such authorization unless explicitly claimed.

The exemplary method 300 may, at step 370, comprise communicating information regarding the determined authorization. Step 370 may comprise communicating such information in any of a variety of manners, non-limiting examples of which will now be provided.

If the communication service provider (or a communication network thereof) determines (e.g., at step 340) that the mobile communication device is authorized (or not authorized) to access an alternative communication network, then communication of such authorization information may be performed. The manner in which such communication of authorization information is performed, including the source and destination of such communication, depends on the system scenario.

For example, in a scenario where a controller of the primary communication network determines the authorization, step 340 may comprise such controller communicating information regarding the authorization (or denial thereof) to the mobile communication device and/or alternative communication network and/or other communication network component.

In another exemplary scenario, step 370 may comprise communicating authorization information to the mobile communication device, where such information comprises an authentication code, encryption/decryption key information and/or other secure access information (e.g., related to accessing the alternative communication network or other network). The mobile communication device may then, for example, utilize such information to conduct communication with the alternative communication network. Similarly, such information could also be communicated to the alternative communication network, either directly from the primary communication network(s) or via the mobile communication device.

In another exemplary scenario, step 370 may comprise communicating information causing the mobile communication device to notify a user of the mobile communication device of alternative communication network communication options available to the user. For example, such notification information may comprise notifying the user that one or more particular alternative communication networks have been determined to be capable of providing a particular level of communication service quality (e.g., better than presently available from the primary communication network). Also for example, such notification information may comprise information to communicate to the user regarding incentives (or disincentives) being offered to the user to utilize an alternative communication network rather than the primary (or native) communication network(s). Further for example, such notification information may comprise information indicating all alternative communication networks in-range of the mobile communication device at its present location to which the mobile communication device is authorized access.

Note that in scenarios where it is determined (e.g., at step 340) that authorization to utilize an alternative communication network is denied, step 370 may comprise communicating information of such denial to the mobile communication device for ultimate presentation to the user thereof.

The previously discussed information may be communicated to the user of the mobile communication device in any of a variety of manners, including audio and/or visual notification, tactile notification, etc.

In general, step 370 may comprise communicating information regarding the determined authorization. Accordingly, the scope of various aspects of the present invention should not be limited to characteristics of any particular manner of communicating such information unless explicitly claimed.

The exemplary method 300 may, at step 395, comprise performing continued operation, non-limiting examples of such continued operation will now be presented.

For example, step 395 may comprise automatically switching the mobile communication device over to the alternative communication network. In an exemplary scenario, the service provider (e.g., a communication network thereof) might determine that switching the mobile communication device over to the alternative communication network is necessary to maintain a present communication (e.g., necessary to merely continue the present communication and/or necessary to continue the present communication at a minimum quality level). In such an exemplary scenario, the service provider may communicate with the mobile communication device and/or alternative communication network to hand-off the present communication to the alternative communication network. Note that such automatic network switching may be performed without any interaction with a user of the mobile communication device, but may also be performed by interacting with the user (e.g., by soliciting permission for the network change from the user).

Also for example, step 395 may comprise tracking utilization of the alternative communication network by the mobile communication device. As discussed previously, access to alternative communication networks and/or access to particular alternative communication networks may be allowed to a controlled extent. For example, on a particular service plan, a particular mobile communication device may be allowed a maximum amount of time and/or bandwidth utilization on an alternative communication network. Step 395 may comprise tracking such utilization. For example, step 395 may comprise monitoring data transfer through particular ports of the mobile communication device. Also for example, step 395 may comprise monitoring execution and/or utilization of particular applications (e.g., VoIP applications, music and/or multimedia applications, file-sharing applications, etc.) on a mobile communication device. Such monitoring may also, for example, be performed by monitoring utilization of particular user interface features (e.g., microphone, keypad, camera, etc.). Such monitoring may further, for example, be performed by monitoring utilization of particular hardware and/or software components of the mobile communication device (e.g., utilization of codecs, vocoders, audio and/or video compressors/decompressors, voice and/or video-related filters, protocol subroutines, etc.).

Further for example, step 395 may comprise determining billing for the mobile communication device based, at least in part, on utilization of the alternative communication network. In various exemplary scenarios, a mobile communication device (or user thereof) may be billed in accordance with alternative network utilization. As explained previously, depending on the communication scenario, a service provider may determine that it is advantageous to the service provider (e.g., when available communication resources in a primary communication network are limited or predicted to be limited) to authorize the mobile communication device to access an alternative communication network, and that in such situation, the service provider may provide incentives (e.g., monetary incentive, service plan class incentive, quality incentive, bandwidth priority incentive, coupon incentive, etc.) to the user of the mobile communication device to encourage utilization of the alternative communication network. In such a scenario, the communication service provider may monitor utilization of the alternative communication network by the mobile communication device to determine whether an offered incentive should be awarded and/or the degree of such incentive. Similar operation applies to disincentives. For example, a mobile communication device at a particular position may be authorized access to an alternative communication network, but may be charged an additional fee. In such a situation, such alternative communication network utilization may be monitored to determine whether a particular disincentive should be applied and/or the degree of such disincentive.

Step 395 may further comprise utilizing such tracking information for any of a variety of purposes. For example, billing was generally discussed previously. Also for example, step 395 may comprise utilizing such tracking information for network load management, network design, resource allocation, etc. Note that such tracking may include tracking of mobile communication device position and/or alternative communication network utilization.

In general, step 395 may comprise performing additional processing and/or operations. Accordingly, the scope of various aspects of the present invention should not be limited by characteristics of any particular continued processing and/or operating activity unless explicitly claimed.

As discussed previously, though FIG. 3 was generally presented in a manner commensurate with performing various method steps by communication network entities associated with the service providers, such method steps may also and/or alternatively be performed by the mobile communication device and/or component(s) of the alternative communication network.

Figure 4:
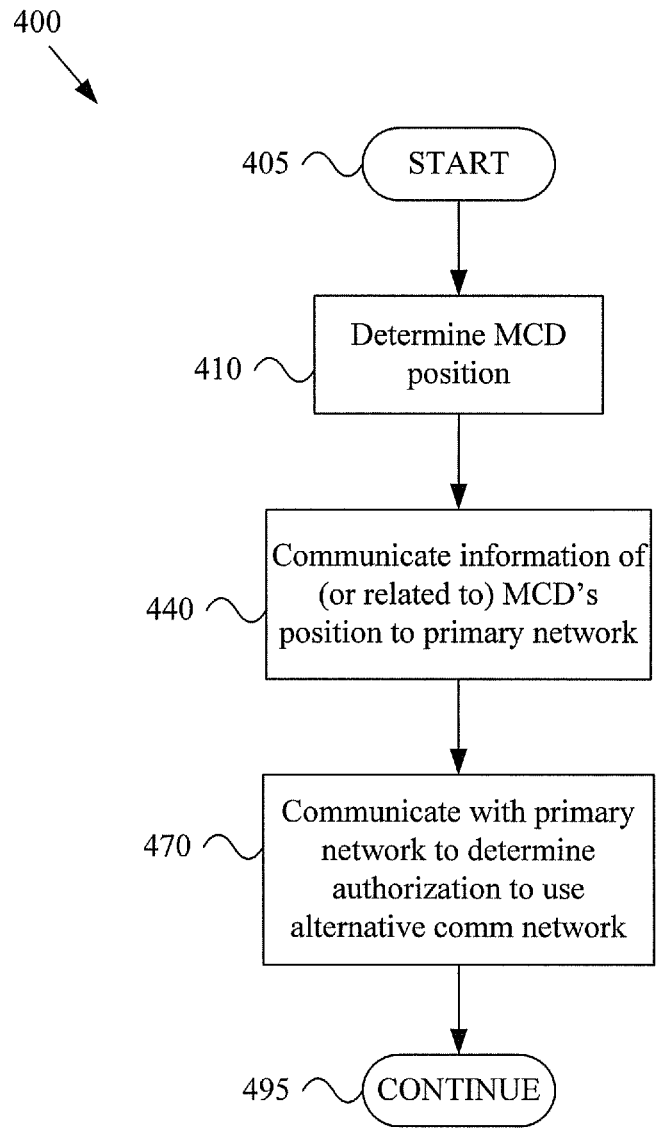
FIG. 4 illustrates a flow diagram of an exemplary method in a system and/or device for implementing position-based control of access to alternative communication networks, in accordance with various aspects of the present invention.

FIG. 4 illustrates a flow diagram of an exemplary method 400 in a system and/or device for implementing position-based control of access to alternative communication networks, in accordance with various aspects of the present invention. As will be discussed throughout the following discussion, the steps of the method 400 may share any or all characteristics with the steps of the method 300 illustrated in FIG. 3 and discussed previously.

The exemplary method 400 may, for example and without limitation, be performed by a mobile communication device (e.g., by one or more hardware and/or software modules thereof). As a non-limiting example, a communication service provider or manufacturer may incorporate software and/or firmware into a mobile communication device to perform authorization determination and/or various activities in support thereof, in accordance with rules specified by the communication service provider or manufacturer. Such authorization determination may, for example, be performed autonomously by a mobile communication device and/or by the mobile communication device in conjunction with the communication service provider (or communication network thereof). For example, any or all steps of the method 400 may be performed by any of the mobile communication devices illustrated in FIG. 1 (items 110, 120, 130, 140 and 150) and/or FIG. 2 (item 205).

Also for example, steps of the exemplary method 400 may be performed by any one or more of a variety of communication network devices. For example, steps of the exemplary method 400 may be performed by communication network infrastructure equipment (e.g., by one or more hardware and/or software modules thereof). For example, referring to FIG. 1, the steps of the exemplary method 400 may be performed by equipment of the wireless carrier central office (e.g., a central controller, subscriber account managing equipment, etc.) of the wireless carrier 142, equipment of the CDMA provider 152, equipment of the wireless LANs illustrated at locations 1 and 2, equipment of the broadband access provider 114, etc. Also for example, referring to FIG. 2, the steps of the exemplary method 400 may be performed by equipment of the cellular network 230, wireless LANs 210 and 215, wireless MAN 220, telecom provider 269 and/or the other service providers illustrated.

The exemplary method 400 may begin executing at step 405. The exemplary method 400 may begin executing in response to any of a variety of causes and conditions, non-limiting examples of which will now be provided. For example, the exemplary method 400 may begin executing in response to any of the causes and/or conditions discussed previously with regard to step 305 of the method 300 illustrated in FIG. 3.

Also for example, the method 400 may begin executing in response to a communication condition detected by a mobile communication device. Such a condition may, for example, comprise a user input, determined position change, detected alternative communication network, receipt of a signal transmitted by a primary communication network, timeout generated by a timer (e.g., a periodic timer), etc.

In general, the exemplary method 400 may begin executing in response to any of a variety of causes and/or conditions. Accordingly, the scope of various aspects of the present invention should not be limited by characteristics of any particular initiating causes and/or conditions unless explicitly claimed.

The exemplary method 400 may, at step 410, comprise determining mobile communication device position. Step 410 may comprise determining mobile communication device position in any of a variety of manners. For example, step 410 may comprise determining mobile communication device position in any of the manners discussed previously (e.g., with regard to step 310 of FIG. 3).

Step 410 may be performed by any of a variety of communication system and/or mobile communication device components. For example, step 410 may be performed by various components of a mobile communication device (e.g., autonomously or with interaction with other systems or components thereof).

In general, step 410 may comprise determining mobile communication device position. Accordingly, the scope of various aspects of the present invention should not be limited to characteristics of any particular manner of performing such determining unless explicitly claimed.

The exemplary method 400 may, at step 440, comprise communicating information of (or related to) the mobile communication device's position. For example and without limitation, step 440 may comprise communicating to a primary communication network the position of the mobile communication device as determined at step 410. As explained previously, the primary communication network may be a primary communication network utilized by the mobile communication device and operated by a communication service provider.

Step 440 may comprise communicating the position information from and to a variety sources and/or destinations. For example, in an exemplary scenario in which a mobile communication device determines (or acquires) the position information, step 440 may comprise communicating such information from the mobile communication device to a primary communication network (e.g., of a communication service provider). Such provider (or network apparatus thereof) may then, for example, process such received position information as discussed previously (e.g., with regard to step 340 of FIG. 3). In another example, step 440 may comprise a position-determining system (e.g., external to the primary communication network and mobile communication device) communicating information of (or related to) mobile communication device position to the primary communication network. In yet another example in which position of the mobile communication device is determined by one or more components of the primary communication network, step 440 may comprise communicating such information from one component of the primary communication network to another component (e.g., the central controller) of the primary communication network.

Step 440 may comprise communicating the information in any of a variety of manners. For example, step 440 may comprise communicating the information utilizing any of a variety of wireless communication protocols (e.g., a protocol associated with the primary communication network). Step 400 may, for example, comprise communicating the information in a solicited or unsolicited manner. In a first exemplary scenario, a protocol utilized by the mobile communication device and the primary communication network may comprise a protocol communication element specifically designed for (e.g., specifically dedicated to) the communication of such position information. In another exemplary scenario, the protocol may comprise a general protocol data element that may be utilized to communicate position information.

In general, step 440 may comprise communicating information of (or related to) the mobile communication device's position. Accordingly, the scope of various aspects of the present invention should not be limited by characteristics of any particular manner of performing such communicating unless explicitly claimed.

The exemplary method 400, at step 470, comprises communicating with the primary network to determine authorization to utilize the alternative communication network. Step 470 may, for example and without limitation, share any or all characteristics with step 370 discussed previously.

For example, as discussed previously in the discussion of FIG. 3, a determination is made (e.g., by the primary communication network, alternative communication network and/or mobile communication device) whether the mobile communication device is authorized to utilize the alternative communication network. Step 470 may comprise communicating with the primary communication network regarding such determined authorization.

For example, in a scenario where the primary communication network makes the ultimate determination of such authorization, step 470 may comprise the primary communication network communicating information of such authorization determination to the mobile communication device and/or the alternative communication network. Such communication may be performed in any of a variety of manners over any of a variety of media. For example, step 470 may comprise the primary communication network communicating authorization information to the mobile communication device over a wireless communication link and/or communicating authorization information to the alternative communication network through a wireless, wired and/or tethered optical backbone.

In general, step 470 may comprise communicating with the primary communication network to determine authorization to utilize the alternative communication network. Accordingly, the scope of various aspects of the present invention should not be limited by characteristics of any particular manner of performing such communicating unless explicitly claimed.

The exemplary method 400 may, at step 495, comprise performing continued activity, non-limiting examples of which will now be presented. For example and without limitation, step 495 may share any or all characteristics with the continued processing discussed previously with regard to step 395 of the method 300 illustrated in FIG. 3.

For example, step 495 may comprise a mobile communication device determining from step 470 that utilization of an alternative communication network is authorized and thus proceed to utilize the alternative communication network. Also for example, step 495 may comprise a mobile communication device determining from step 470 that utilization of an alternative communication network is not authorized, and thus explore other communication options.

Step 495 may, for example, comprise communicating with a user of the mobile communication device regarding whether authorization to utilize an alternative communication network has been granted. Step 495 may then, for example, comprise interacting with a user of the mobile communication device to perform such utilization or to explore other communication options. As explained in a previous example, the primary communication network may provide incentives and/or disincentives for utilizing the alternative communication network. In such a scenario, step 495 may comprise interacting with a user of the mobile communication device regarding such incentives/disincentives.

In general, step 495 may comprise performing continued processing and/or operation. Accordingly, the scope of various aspects of the present invention should not be limited by characteristics of any particular continued processing and/or operation, unless explicitly claimed.

Figure 5:
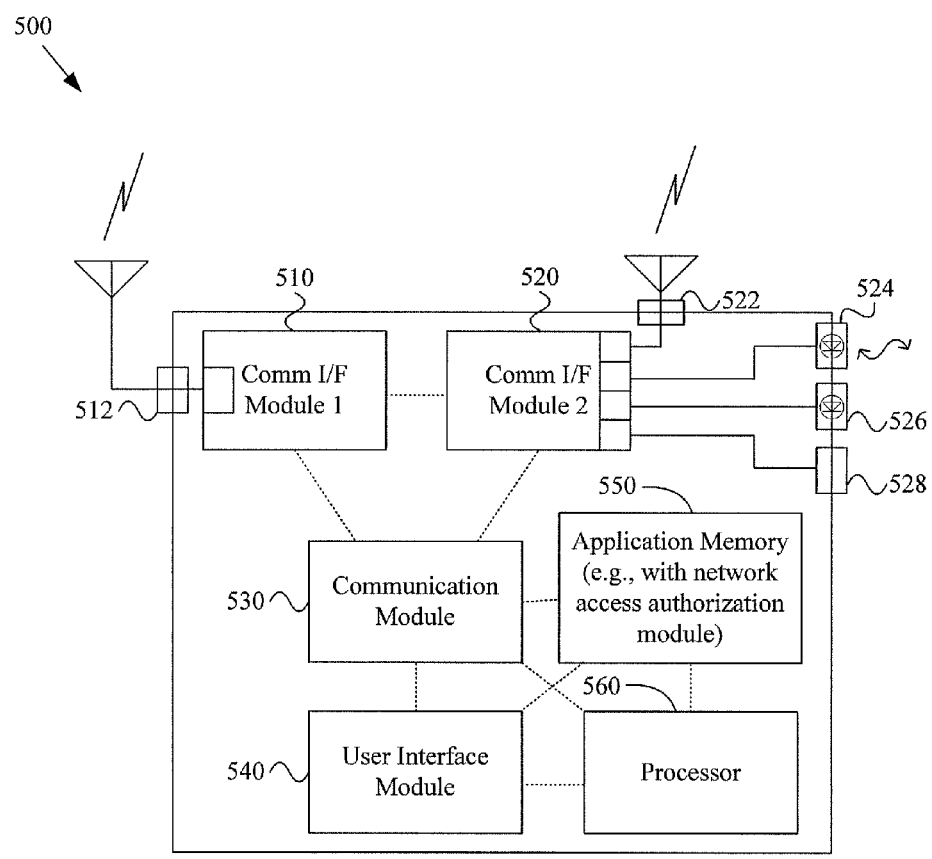
FIG. 5 is a diagram illustrating an exemplary system and/or device incorporating position-based control of access to alternative communication networks, in accordance with various aspects of the present invention.
Figure 6:
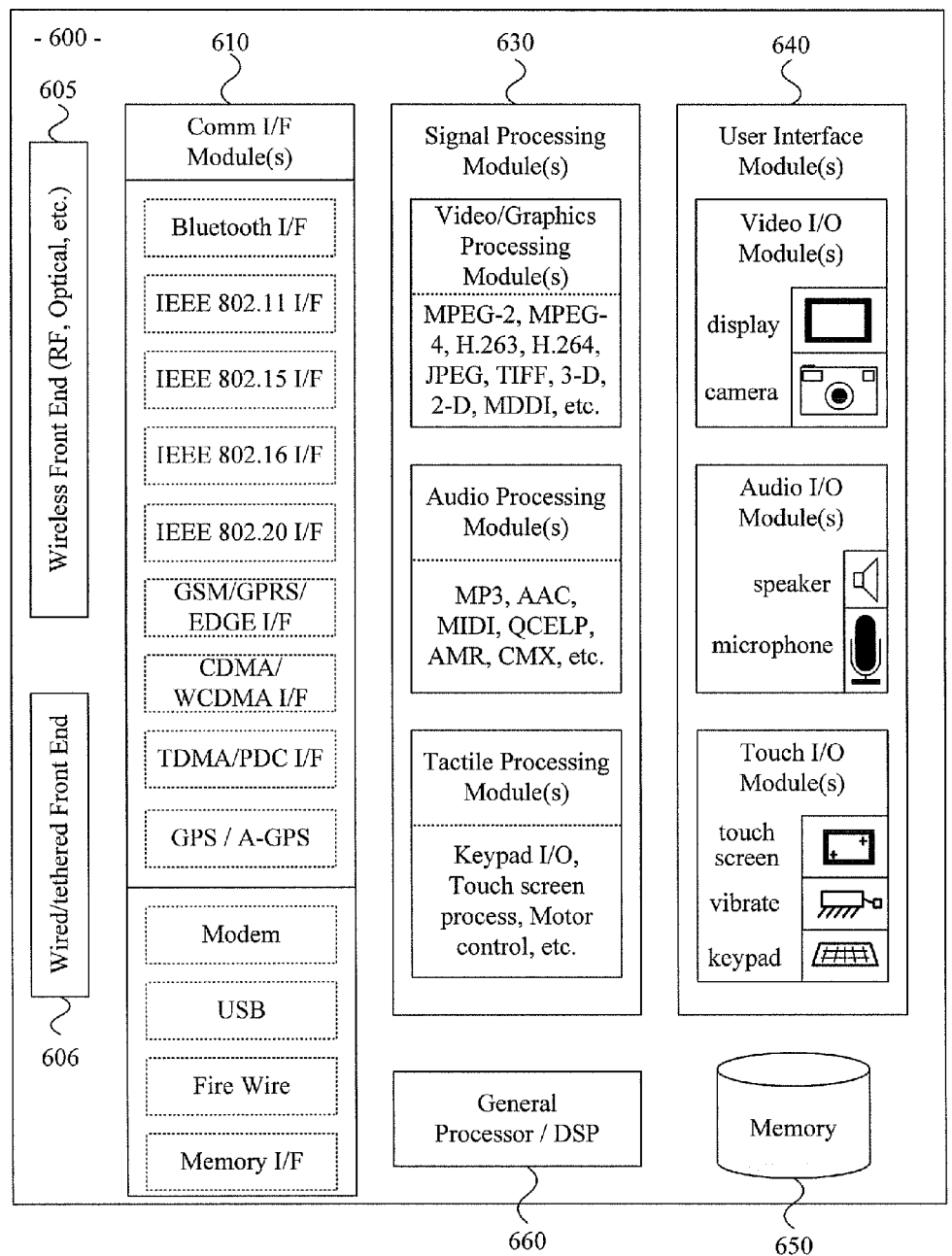
FIG. 6 is a diagram illustrating an exemplary system and/or device incorporating position-based control of access to alternative communication networks, in accordance with various aspects of the present invention.

As explained in the previous discussion of FIGS. 1-4, various aspects of the present invention may be performed by a mobile communication device and/or various communication network components. FIGS. 5 and 6, to be discussed next, provide non-limiting illustrations of a mobile communication device and/or network component, which operate to (e.g., are operable to, adapted to, operate when enabled to, configured to, etc.) perform the method steps presented previously in the discussion of FIGS. 3-4. Such illustrations also provide exemplary functional diagrams of various entities illustrated in FIGS. 1-2. For example, FIGS. 5 and 6 provide exemplary functional diagrams of the mobile communication devices illustrated in FIGS. 1-2. Also for example, FIGS. 5-6 provide exemplary functional diagrams of various communication network infrastructure components (e.g., access points, base stations, network controllers, etc.) illustrated in FIGS. 1-2.

FIG. 5 is a diagram illustrating an exemplary system and/or device 500 incorporating position-based control of access to alternative communication networks, in accordance with various aspects of the present invention.

The exemplary system and/or device 500 may, for example, represent a component in a communication network infrastructure (e.g., a network controller, a base station or access point, etc.). The exemplary system and/or device 500 may also, for example, represent a communication device (e.g., a stationary or mobile communication device) that utilizes a communication network for communications with other communication devices, information servers, etc.).

The exemplary system and/or device 500 may, for example, comprise a first communication interface module 510. The exemplary first communication interface module 510 is a wireless RF interface module that operates to utilize the first antenna 512 to communicate with other devices through a wireless RF medium. Though shown by example as utilizing the RF medium, the first communication interface module 510 may operate to communicate through any one or more of a variety of communication media (e.g., wired, wireless, tethered optical, non-tethered optical, etc.) utilizing any of a variety of communication protocols. Non-limiting examples of such media and/or protocols are illustrated in FIG. 6.

The exemplary system and/or device 500 may also, for example, comprise at least a second communication interface module 520. The exemplary second communication interface module 520 may, for example, operate to utilize any of a variety of interface apparatus to communicate through any of a variety of communication media utilizing any of a variety of communication protocols. For example, the second communication interface module 520 may operate to utilize a second antenna 522 to communicate through a wireless RF medium utilizing a wireless RF communication protocol. Also for example, the second communication interface module 520 may operate to utilize a non-tethered optical port 524 (e.g., utilizing infrared, various laser frequencies, etc.) to communicate through a wireless or non-tethered medium utilizing any of a variety of communication protocols. Additionally for example, the second communication interface module 520 may operate to utilize a tethered optical port 526 (e.g., utilizing infrared, various laser frequencies, etc.) to communicate through a tethered optical medium (e.g., fiber-optic cable, etc.) utilizing any of a variety of communication protocols. Further for example, the second communication interface module 520 may operate to utilize a wired communication port 528 to communicate through a wired medium utilizing any of a variety of communication protocols.

The exemplary system and/or device 500 may comprise a communication module 530 that operates to manage communication through the first and second communication interface modules 510, 520. Such communication module 530 may, for example, operate to utilize the first and second communication modules 510, 520 to communicate serially and/or concurrently (i.e., simultaneously and/or pseudo-simultaneously in a time-shared manner). Such communication module 530 may, for example, operate to utilize the first and/or second communication modules 510, 520 to perform any of the communications discussed previously with regard to the exemplary methods 300, 400 illustrated in FIGS. 3-4. Non-limiting examples of such communications may, for example, comprise conducting communications with a variety of communication network systems (e.g., cellular communication, wireless computer network communication, satellite communication, GPS satellite communication, communication with an A-GPS system, etc.)

The exemplary system and/or device 500 may also comprise a user interface module 540 that operates to interface with a user utilizing any of a variety of user interface features. In a first exemplary scenario, where the exemplary system and/or device 500 is a communication network infrastructure system and/or component, the user interface module 540 may operate to interface with a communication network operator and/or maintenance technician. In a second exemplary scenario, where the exemplary system and/or device 500 is a mobile communication device, the user interface module 540 may operate to communicate with a user of such device. For example, the user interface module 540 may operate to perform any of the exemplary user communications discussed previously with regard to the exemplary methods 300, 400 illustrated in FIGS. 3-4.

The exemplary system and/or device 500 may additionally comprise a processor 500 that operates to execute instructions stored in a memory 550 (e.g., software and/or firmware instructions). The memory 550 may, for example, operate to store instructions that, when executed by the processor 560, operate to perform any of the operations discussed previously with regard to FIGS. 3-4. Alternatively, such operation may be performed by dedicated hardware and/or any of a variety of combinations of dedicated hardware and one or more processors executing instructions stored in memory.

In a first exemplary scenario, such operation may, for example, comprise operating to determine when to begin execution (e.g., as discussed with regard to step 305).

Continuing the first exemplary scenario, such operation may, for example, comprise operating to determine position of a mobile communication device (e.g., as discussed with regard to step 310). Such operation may comprise utilizing any of the other modules of the exemplary system and/or device 500 (e.g., to receive information of mobile communication device position from a user, from a position-determining system, from a mobile communication device, components external or internal to the communication system, from an alternative communication network, etc.). For example, such operation may comprise utilizing the first and/or second communication interface modules 510, 520, the user interface module 540, etc.

Continuing the first exemplary scenario, such operation may, for example, comprise operating to determine, based at least in part on the determined position of the mobile communication device, whether the mobile communication device is authorized to access an alternative communication network (e.g., as discussed with regard to step 340). Such operation may comprise utilizing any of the other modules of the exemplary system and/or device 500. For example, such operation may comprise utilizing the processor 560 to execute instructions stored in memory 550, which may for example comprise a network access authorization module.

Continuing the first exemplary scenario, such operation may, for example, comprise operating to communicate information regarding whether a mobile communication device has been determined to be authorized to utilize an alternative communication network (e.g., as discussed with regard to step 370). Such communication may, for example, be performed utilizing the first and/or second communication modules 510, 520.

Continuing the first exemplary scenario, such operation may, for example, comprise operating to perform any of a variety of continued processing (e.g., as discussed with regard to step 395).

In a second exemplary scenario, such operation may, for example, comprise operating to determine when to begin execution (e.g., as discussed with regard to step 405).

Continuing the second exemplary scenario, such operation may, for example, comprise operating to determine mobile communication device position (e.g., as discussed with regard to step 410). Such operation may comprise utilizing any of the other modules of the exemplary system and/or device 500 (e.g., to receive information of mobile communication device position from a user, from a position-determining system, from a mobile communication device, components external or internal to the communication system, from an alternative communication network, etc.). Such operation may also, for example, utilize any of the modules of the exemplary system and/or device 500 to determine position of the mobile communication device by processing signals received from a positioning system. For example, such operation may comprise utilizing the first and/or second communication interface modules 510, 520, the user interface module 540, etc.

Continuing the second exemplary scenario, such operation may, for example, comprise operating to communicate mobile communication device position information (e.g., as discussed with regard to step 440). Such operation may, for example, be performed by utilizing the first and/or second communication interface modules 510, 520 to perform such communication (e.g., to and/or from a primary communication network).

Continuing the second exemplary scenario, such operation may, for example, comprise operating to communicate with a primary communication network to determine authorization to utilize an alternative communication network (e.g., as discussed with regard to step 470). For example, the processor 560 of a mobile communication device 500 may execute instructions stored in the memory 550, which in turn interfaces with the communication module 530 and/or communication interface modules 510, 520 to communicate with a primary communication network to determine whether access to an alternative communication network is authorized by the primary communication network (e.g., such authorization having been determined by the primary communication network based, at least in part, on the location of the mobile communication device).

Continuing the second exemplary scenario, such operation may, for example, comprise operating to perform any of a variety of continued processing (e.g., as discussed with regard to step 495).

In a third exemplary scenario, a network component (e.g., a network controller exemplified by the block diagram 500 of FIG. 5) may operate in accordance with the steps of the method 300 illustrated in FIG. 3, while a mobile communication device (e.g., exemplified by the block diagram 500 of FIG. 5) may operate in accordance with the steps of the method 400 illustrated in FIG. 4.

Note that the exemplary system and/or device 500 illustrated in FIG. 5 has been presented in terms of functional blocks. Such blocks (or modules) may be implemented by hardware, software or a combination thereof (e.g., by dedicated hardware and/or by processor(s) executing instructions stored in memory). Additionally, such modules were illustrated as distinct entities for illustrative clarity, but in practice such modules may share various hardware and/or software components. For example, a same processor may execute software instructions to perform more than one of the operations discussed previously. Similarly, software/firmware modules (e.g., functional routines) may be shared for performing more than one of the operations discussed previously. Accordingly, the scope of various aspects of the present invention should not be limited by an arbitrary boundary between modules unless explicitly claimed.

Turning next to FIG. 6, such figure is a diagram illustrating an exemplary system and/or device 600 incorporating position-based control of access to alternative communication networks, in accordance with various aspects of the present invention. The exemplary system 600 may, for example and without limitation, share any or all characteristics with the exemplary system 500 illustrated in FIG. 5 and discussed previously.

For example, the exemplary system and/or device 600 comprises one or more wireless front end modules 605 (e.g., wireless RF, non-tethered optical, etc.), wired and/or tethered front end modules 606 (e.g., wired, tethered optical, etc.), and communication interface modules 610 (e.g., Bluetooth, IEEE 802.11, IEEE 802.15, IEEE 802.16, IEEE 802.20, GSM/GPRS/EDGE, CDMA/WCDMA/CDMA-2000, TDMA/PDC, GPS (or other positioning system), A-GPS, Modem, USB, FireWire, etc.), any or all of which may share any or all aspects with the communication interface modules 510, 520 and/or communication module 530 illustrated in FIG. 5.

Also for example, the exemplary system and/or device 600 comprises a processor/DSP 660, memory 650 and/or plurality of signal processing modules 630 (video/graphics processing modules, audio processing modules, tactile processing modules, etc.), any or all of which may share any or all aspects with the processor 560 and memory 550 illustrated in FIG. 5. Additionally for example, the exemplary system and/or device 600 comprises one or more user interface modules 640 (e.g., video I/O modules, audio I/O modules, touch or tactile I/O modules, etc.), any or all of which may share any or all aspects with the user interface module 540 illustrated in FIG. 5.

Various exemplary structural and/or functional aspects of the present invention were illustrated in FIGS. 1-6 and discussed previously. Various aspects of the present invention may be implemented in any of a variety of manners. For example and without limitation, as discussed previously, any or all functional aspects of the present invention may be implemented by hardware, software and/or a combination thereof. For example, the various blocks illustrated in FIGS. 3-6 may be implemented by dedicated hardware and/or by a processor executing software or firmware instructions stored in memory. As a non-limiting example, all blocks or various combinations of blocks may be implemented in one or more integrated circuits.

Additionally, as discussed previously, various aspects of the present invention were illustrated and discussed modularly. It should be recognized that various module boundaries were established and presented for illustrative clarity. For example, various modules may share various hardware and/or software components. Also for example, various modules may be implemented separately (e.g., in respective integrated circuits or a combined integrated circuit).

In summary, various aspects of the present invention provide a system and method for determining, based at least in part on communication device position, whether access to an alternative communication network is authorized.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for at least one module in a native communication network, comprising:
   providing authorization to a mobile communication device to access the native communication network, wherein the native communication network is operated by a first service provider and within a billing system of the first service provider;
   receiving a request by the mobile communication device to access a non-native communication network, wherein the non-native communication network is operated by and under control of a second service provider and within a billing system of the second service provider;
   determining by the at least one module in the native communication network to authorize the mobile communication device to switch from the native communication network to the non-native communication network by:
   determining a position of the mobile communication device and current bandwidth utilization of the native communication network at the determined position of the mobile communication device; and when the current bandwidth utilization of the native communication network at the determined position compares unfavorably to a bandwidth utilization threshold, determining to authorize the mobile communication device to access the non-native communication network.

2. The method of claim 1, wherein determining authorization of the mobile communication device to access the non-native communication network includes:
determining communication quality of the native communication network at the determined position of the mobile communication device; and
when communication quality of the native communication network at the determined position compares unfavorably to a quality communication threshold, determining to authorize the mobile communication device to access the non-native communication network.

3. The method of claim 1, wherein determining authorization of the mobile communication device to access the non-native communication network includes:
predicting a future bandwidth utilization of the native communication network at the determined position of the mobile communication device; and
when the predicted future bandwidth utilization of the native communication network at the determined position compares unfavorably to a bandwidth utilization threshold, determining to authorize the mobile communication device to access the non-native communication network.

4. The method of claim 1, wherein determining authorization of the mobile communication device to access the non-native communication network includes:
determining a type of information requested by the mobile communication device; and
determining to authorize the mobile communication device to access the non-native communication network in response to the determined position of the mobile communication device and the type of information requested by the mobile communication device.

5. The method of claim 1, wherein determining authorization of the mobile communication device to access the non-native communication network includes:
determining a time-of-day; and
determining to authorize the mobile communication device to access the non-native communication network in response to the determined position of the mobile communication device and the time-of-day.

6. The method of claim 1, wherein determining authorization of the mobile communication device to access the non-native communication network includes:
determining an identity of a business entity associated with the non-native communication network; and
determining to authorize the mobile communication device to access the non-native communication network in response to the determined position of the mobile communication device and the identity of the business entity associated with the non-native communication network.

7. The method of claim 1, further comprising:
communicating authorization information to the non-native communication network.

8. The method of claim 1, further comprising:
authorizing the mobile communication device to access the non-native communication network; and
tracking utilization of the non-native communication network by the mobile communication device.

9. The method of claim 1, wherein determining the position of the mobile communication device includes receiving position information from the mobile communication device.

10. The method of claim 9, wherein the position information received from the mobile communication device comprises geographical coordinate information.

11. The method of claim 1, wherein determining the position of the mobile communication device includes receiving position information from the non-native communication network.

12. A network element in a first cellular communication network comprising:
at least one processor operable to:
provide authorization to a mobile communication device to access the first cellular communication network;
receive a request by the mobile communication device to access a wide area network using a second wireless local area (WLAN) network;
determine a position of the mobile communication device;
in response to the determined position of the mobile communication device, determine authorization of the mobile communication device to access the wide area network using the second WLAN network by:
determining a current bandwidth utilization of the cellular communication network at the determined position of the mobile communication device; and
when the current bandwidth utilization of the cellular communication network at the determined position compares unfavorably to a bandwidth utilization threshold, determining to authorize the mobile communication device to access the wide area network using the second WLAN network; and
communicate authorization information to the mobile communication device.

13. The wireless device of claim 12, wherein the at least one processor is operable to determine authorization of the mobile communication device to access the wide area network using the second WLAN network by:
determining communication quality of the cellular communication network at the determined position of the mobile communication device; and
when communication quality of the cellular communication network at the determined position compares unfavorably to a quality communication threshold, determining to authorize the mobile communication device to access the wide area network using the second WLAN network.

14. The wireless device of claim 12, wherein the at least one processor is operable to determine authorization of the mobile communication device to access the wide area network using the second WLAN network by:
predicting a future bandwidth utilization of the cellular communication network at the determined position of the mobile communication device; and
when the predicted future bandwidth utilization of the cellular communication network at the determined position compares unfavorably to a bandwidth utilization threshold, determining to authorize the mobile communication device to access the wide area network using the second WLAN network.

15. The wireless device of claim 12, wherein the at least one processor is operable to determine authorization of the mobile communication device to access the wide area network using the second WLAN network by:

determining a type of information requested by the mobile communication device; and determining to authorize the mobile communication device to access the wide area network using the second WLAN network in response to the determined position of the mobile communication device and the type of information requested by the mobile communication device.

16. The wireless device of claim 12, wherein the at least one processor is operable to determine authorization of the mobile communication device to access the wide area network using the second WLAN network by:

determining a time-of-day; and determining to authorize the mobile communication device to access the wide area network using the second WLAN network in response to the determined position of the mobile communication device and the time-of-day.

17. The wireless device of claim 12, wherein the at least one processor is operable to determine authorization of the mobile communication device to access the wide area network using the second WLAN network by:

determining an identity of a business entity associated with the second WLAN network; and determining to authorize the mobile communication device to access the wide area network using the second WLAN network in response to the determined position of the mobile communication device and the identity of the business entity associated with the second WLAN network.

18. The wireless device of claim 12, wherein the at least one processor is further operable to:

communicate authorization information to the second WLAN network.

19. The wireless device of claim 12, wherein the at least one processor is further operable to:

authorize the mobile communication device to access the second WLAN network; and track utilization of the second WLAN network by the mobile communication device.

20. The wireless device of claim 12, wherein the at least one processor is operable to determine the position of the mobile communication device by receiving position information from the mobile communication device.

21. The wireless device of claim 20, wherein the position information received from the mobile communication device comprises geographical coordinate information.

22. The wireless device-of claim 12, wherein the at least one processor is operable to determine the position of the mobile communication device by receiving position information from the second WLAN network.

23. A method for at least one module in a native communication network, comprising:

providing authorization to a mobile communication device to access the native communication network, wherein the native communication network is operated by a first service provider;

receiving a request by the mobile communication device to access a non-native communication network, wherein the non-native communication network is operated by a second service provider;

determining by the at least one module in the native communication network to authorize the mobile communication device to switch from the native communication network to the non-native communication network by:

determining a position of the mobile communication device;

predicting a future bandwidth utilization of the native communication network at the determined position of the mobile communication device;

determining the predicted future bandwidth utilization of the native communication network at the determined position compares unfavorably to a bandwidth utilization threshold; and authorizing the mobile communication device to access the non-native communication network.

* * * * *